United States Patent
Chung et al.

(10) Patent No.: US 10,803,832 B2
(45) Date of Patent: Oct. 13, 2020

(54) SYNCHRONIZING HOLOGRAPHIC DISPLAYS AND 3D OBJECTS WITH PHYSICAL VIDEO PANELS

(71) Applicant: Samsung Electronics Co., Ltd., Suwon-si, Gyeonggi-do (KR)

(72) Inventors: David H. Chung, Rancho Palos Verdes, CA (US); Nils Harrison, Irvine, CA (US); Brian Nhu Dang, Tustin, CA (US); Christopher F. Lee, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 16/006,669

(22) Filed: Jun. 12, 2018

(65) Prior Publication Data
US 2019/0043447 A1    Feb. 7, 2019

Related U.S. Application Data

(60) Provisional application No. 62/539,808, filed on Aug. 1, 2017.

(51) Int. Cl.
*G09G 5/12*    (2006.01)
*G06F 3/0481*    (2013.01)
(Continued)

(52) U.S. Cl.
CPC ............ *G09G 5/12* (2013.01); *G02B 27/017* (2013.01); *G02B 27/0172* (2013.01);
(Continued)

(58) Field of Classification Search
CPC ................................................. G02B 27/0172
See application file for complete search history.

(56) References Cited

U.S. PATENT DOCUMENTS

| 8,733,928 B1 | 5/2014 | Lewis |
| 2012/0127284 A1* | 5/2012 | Bar-Zeev ............. G02B 27/017 348/53 |

(Continued)

FOREIGN PATENT DOCUMENTS

| EP | 3096517 A1 | 11/2016 |
| JP | 201205191 A | 10/2012 |

(Continued)

OTHER PUBLICATIONS

International Search Report and Written Opinion dated Nov. 9, 2018 for International Application PCT/KR2018/008610 from Korean Intellectual Property Office, pp. 1-13, Republic of Korea.

(Continued)

*Primary Examiner* — Jitesh Patel
(74) *Attorney, Agent, or Firm* — Sherman IP LLP; Kenneth L. Sherman; Steven Laut

(57) ABSTRACT

A method of coordinating a mixed-reality (MR) configured head-mounted display (HMD) with a separate media device to enable a synchronized user experience. The method includes establishing a communication channel between the HMD and the media device. At least one of the following is performed via the communication channel: accessing content on the media device or executing control commands on the media device based on an interface displayed by the HMD, or detecting media content presented by the media device and synchronizing display of MR content on the HMD and the detected media content.

20 Claims, 15 Drawing Sheets

(51) Int. Cl.
*G06Q 30/02* (2012.01)
*G06F 3/0482* (2013.01)
*G06T 19/00* (2011.01)
*G02B 27/01* (2006.01)
*G03H 1/22* (2006.01)
*G03H 1/00* (2006.01)

(52) U.S. Cl.
CPC ....... *G03H 1/2249* (2013.01); *G06F 3/04815* (2013.01); *G06Q 30/0241* (2013.01); *G06T 19/006* (2013.01); *G02B 2027/014* (2013.01); *G02B 2027/0141* (2013.01); *G02B 2027/0174* (2013.01); *G03H 1/0005* (2013.01); *G03H 2001/0055* (2013.01); *G03H 2001/2284* (2013.01); *G06F 3/0482* (2013.01); *G06T 2219/024* (2013.01); *G09G 2354/00* (2013.01); *G09G 2370/06* (2013.01)

(56) References Cited

U.S. PATENT DOCUMENTS

| | | |
|---|---|---|
| 2013/0307856 A1 | 11/2013 | Keane et al. |
| 2014/0139439 A1* | 5/2014 | Park .................... G06F 3/04886 345/169 |
| 2014/0139551 A1 | 5/2014 | McCulloch et al. |
| 2014/0222558 A1 | 8/2014 | Spivack |
| 2014/0320389 A1* | 10/2014 | Scavezze ................ G06F 3/011 345/156 |
| 2015/0016777 A1 | 1/2015 | Abovitz et al. |
| 2015/0061973 A1 | 3/2015 | Park et al. |
| 2015/0145653 A1 | 5/2015 | Katingari et al. |
| 2015/0364113 A1* | 12/2015 | Ahn ........................ G09G 5/12 345/156 |
| 2015/0379770 A1 | 12/2015 | Haley, Jr. et al. |
| 2016/0027216 A1 | 1/2016 | da Veiga et al. |
| 2016/0371886 A1 | 12/2016 | Thompson et al. |
| 2017/0052373 A1 | 2/2017 | Memmott et al. |
| 2017/0052507 A1* | 2/2017 | Poulos .................. G06T 19/006 |
| 2017/0169610 A1* | 6/2017 | King .................... G02B 27/017 |
| 2019/0191203 A1* | 6/2019 | Asbun .............. H04N 21/41407 |

FOREIGN PATENT DOCUMENTS

| | | | | |
|---|---|---|---|---|
| JP | 6126271 B1 | 5/2017 | | |
| KR | 20150046832 A | 5/2015 | | |
| WO | WO-2015072787 A1 * | 5/2015 | ......... | G06F 3/04883 |
| WO | 2017106072 A2 | 6/2017 | | |

OTHER PUBLICATIONS

Extended European Search Report dated May 26, 2020 for European Application No. 18841737.2 from European Patent Office, pp. 1-7 Munich, Germany.

* cited by examiner

SYNCHRONIZING HOLOGRAPHIC DISPLAYS AND 3D OBJECTS WITH PHYSICAL VIDEO PANELS

CROSS-REFERENCE TO RELATED APPLICATIONS

This application claims the priority benefit of U.S. Provisional Patent Application Ser. No. 62/539,808, filed Aug. 1, 2017, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to holographic content, and in particular, to synchronizing holographic content with display and user interface (UI) technology.

BACKGROUND

Virtual reality devices, such as head-mounted devices, may be used in a variety of real and/or virtual world environments and contexts. Augmented reality devices are types of virtual reality devices that can support direct or indirect views of a real world environment along with augmented reality objects digitally projected on the real world scene. Augmented reality devices can also operate as scene-aware devices that have an understanding of a real world environment defined as an augmented reality environment (i.e., virtual environment) supported by the augmented reality device. An augmented reality device can support presentation of the augmented reality objects, which are virtualized entities (e.g., holographic content or mixed-reality content), that are rendered for a user associated with the augmented reality device.

SUMMARY

One or more embodiments relate to synchronizing holographic content with display and user interface (UI) technology. In some embodiments, a method of coordinating a mixed-reality (MR) configured head-mounted display (HMD) with a separate media device to enable a synchronized user experience. The method includes establishing a communication channel between the HMD and the media device. At least one of the following is performed via the communication channel: accessing content on the media device or executing control commands on the media device based on an interface displayed by the HMD, or detecting media content presented by the media device and synchronizing display of MR content on the HMD and detected media content.

In some embodiments, an apparatus comprises a memory storing instructions. At least one processor executes the instructions including a process configured to: establish a communication channel between an MR HMD and a media device; and perform using the communication channel, at least one of: accessing content on the media device or executing control commands on the media device based on an interface displayed by the HMD; or detecting media content presented by the media device and synchronizing display of MR content on the HMD and the detected media content.

In some embodiments, a non-transitory processor-readable medium that includes a program that when executed by a processor performs a method comprising establishing a communication channel between an MR HMD and a media device, and performing using the communication channel, at least one of: accessing content on the media device or executing control commands on the media device based on an interface displayed by the HMD; or detecting media content presented by the media device and synchronizing display of MR content on the HMD and detected media content.

These and other features, aspects and advantages of the one or more embodiments will become understood with reference to the following description, appended claims and accompanying figures.

DETAILED DESCRIPTION

Figure 1:
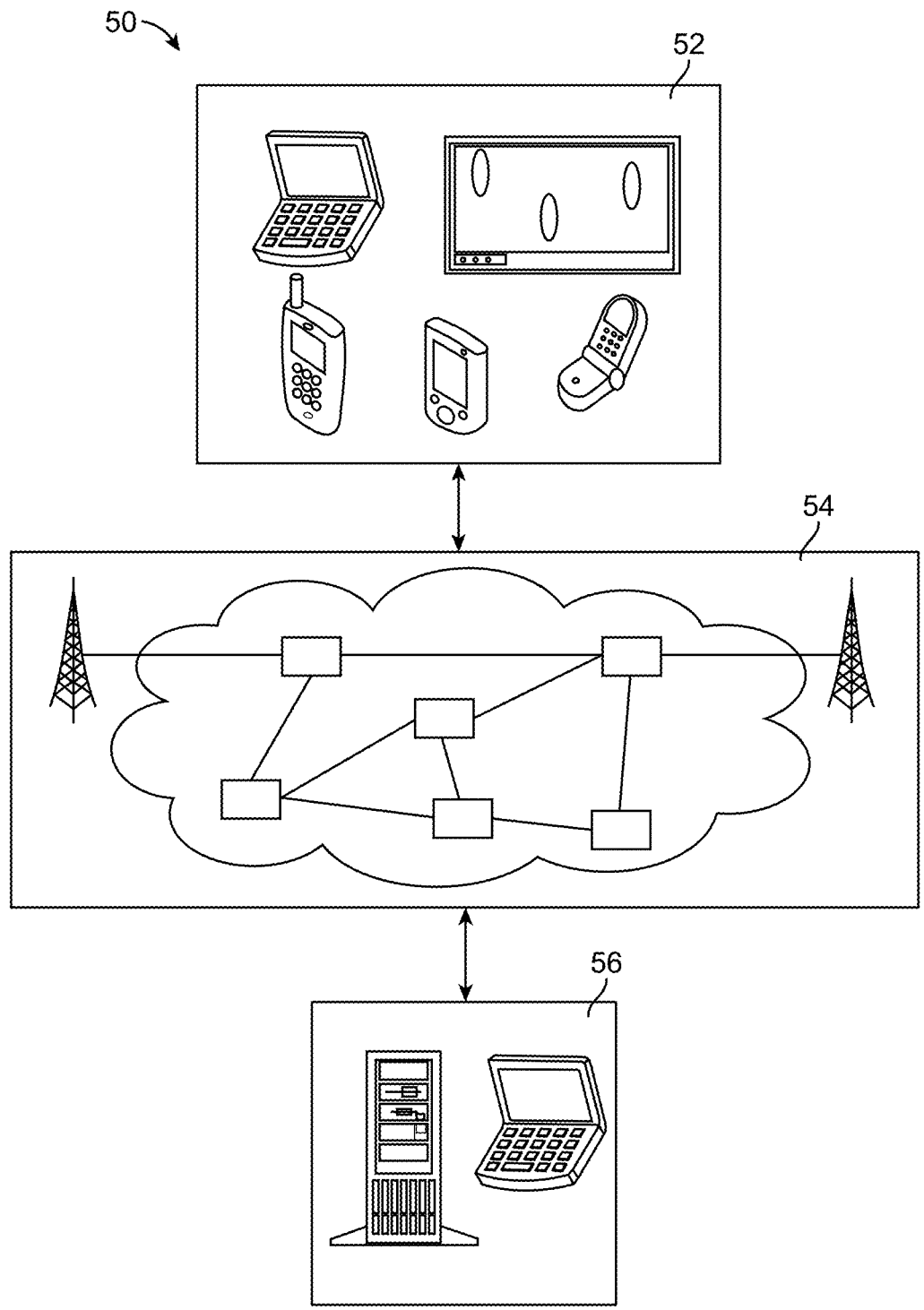
FIG. 1 shows an electronic system with an overlay enhancement mechanism, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Some embodiments provide synchronizing of holographic content with display and user interface (UI) technology. In some embodiments, a method of coordinating a mixed-reality (MR) configured head-mounted display (HMD) with a separate media device to enable a synchronized user experience. The method includes establishing a communication channel between the HMD and the media device. At least one of the following is performed via the communication channel: accessing content on the media device or executing control commands on the media device based on an interface displayed by the HMD, and detecting media presented by the media device and synchronizing display of content associated with the detected media on the HMD.

The term "image" referred to herein may include a two-dimensional image, three-dimensional image, video frame, a computer file representation, an image from a camera, a video frame, or a combination thereof. For example, the image may be a machine readable digital file, a physical photograph, a digital photograph, a motion picture frame, a video frame, an x-ray image, a scanned image, or a combination thereof. The image may be generated from pixels arranged in a rectangular array. The image may include an x-axis along the direction of the rows and a y-axis along the direction of the columns. The term "image" may indicate a still image or a moving picture of a video, i.e., the latter indicating the video itself. The term "image" may include a partial or the entire screen image displayable on a display besides a still image (e.g., a photograph) or a video. In addition, the term "image" may also originally include a displayable screen image itself such as a user interface or a webpage besides a still image (e.g., a photograph) or a video.

In some embodiments, holographic technology that is able to project 3D representations as if they were in the same space as the user is generated. The holographic technology may include a head-mounted-display (HMD) (e.g., HMD 320, FIG. 3) that is worn by a user. The HMD shows holograms by projecting light onto a transparent screen that is worn over the user's eyes. In some embodiments, the holographic technology is combined with display technology (such as a TV device 250, FIG. 2, a TV device 310, FIG. 3, etc.), including Large Format Display/LFD), synchronizing the HMD and TV and providing for the two to work together to heighten the user experience.

In some embodiments, users are able to view and interact with holograms positioned relative to the screen that they are watching content on. Users can simultaneously enjoy an uncompromised, high-resolution experience on the screen, while also viewing holograms off-screen. Holograms displayed to the user supplement and synchronize with the content displayed on the screen being viewed, such as movies, TV shows, shopping experiences, gaming, advertisements, etc.

FIG. 1 shows an electronic system 50 with an overlay enhancement mechanism in some embodiments. The electronic system 50 includes a first device 52, such as a client or a server, connected to a second device 56, such as a client or server. The first device 52 may communicate with the second device 56 with a communication path 54, such as a wireless or wired network.

In one example, the first device 52 may be of any of a variety of display devices, such as ultra-high definition (UD), 4K (8K, etc.) display devices, such as a UD television (UDTV), 4K TV, 8K TV, tablet device, smart phone, personal digital assistant (PDA), a notebook computer, a liquid crystal display (LCD) system, a wearable device, mobile computing device, projection device, or other multi-functional displays or entertainment devices. The first device 52 may couple directly or indirectly to the communication path 54 to communicate with the second device 56 or may be a stand-alone device.

For illustrative purposes, the display system 50 is described with the first device 52 as a display device, although it is understood that the first device 52 may be a variety of different types of devices. For example, the first device 52 may also be a device for presenting images or a multi-media presentation. A multi-media presentation may be a presentation including sound, a sequence of streaming images or a video feed, or a combination thereof. As an example, the first device 52 may be a UDTV, or any other type of UD display device (e.g., monitor, video panel, HUD, smart telephone, tablet device, video device, gaming device, etc.).

The second device 56 may be any of a variety of centralized or decentralized computing devices, image or video transmission devices. For example, the second device 56 may be a multimedia computer, a tablet, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, BDP, a recording device, such as a camera or video camera, or a combination thereof. In another example, the second device 56 may be a signal receiver for receiving broadcast or live stream signals, such as a television receiver, STB, a cable box, a satellite dish receiver, or a web enabled device.

The second device 56 may be centralized in a single room, distributed across different rooms, distributed across different geographical locations, embedded within a telecommunications network, etc. The second device 56 may have a means for coupling with the communication path 54 to communicate with the first device 52.

For illustrative purposes, the electronic system 50 is described with the second device 56 as a computing device, although it is understood that the second device 56 may be different types of devices. Also, for illustrative purposes, the display system 50 is shown with the second device 56 and the first device 52 as end points of the communication path 54, although it is understood that the display system 50 may have a different partition between the first device 52, the second device 56, and the communication path 54. For example, the first device 52, the second device 56, or a combination thereof may also function as part of the communication path 54.

The communication path 54 may be a variety of networks. For example, the communication path 54 may include wireless communication, wired communication, optical, ultrasonic, or the combination thereof. Satellite communication, cellular communication, BLUETOOTH®, Infrared Data Association standard (IrDA), wireless fidelity (WiFi), and worldwide interoperability for microwave access (Wi-MAX) are examples of wireless communication that may be included in the communication path 54. Ethernet, digital subscriber line (DSL), fiber to the home (FTTH), high-definition multimedia interface (HDMI) cable, and plain old telephone service (POTS) are examples of wired communication that may be included in the communication path 54.

Further, the communication path 54 may traverse a number of network topologies and distances. For example, the communication path 54 may include direct connection, personal area network (PAN), local area network (LAN), metropolitan area network (MAN), wide area network (WAN), or a combination thereof.

Figure 2:
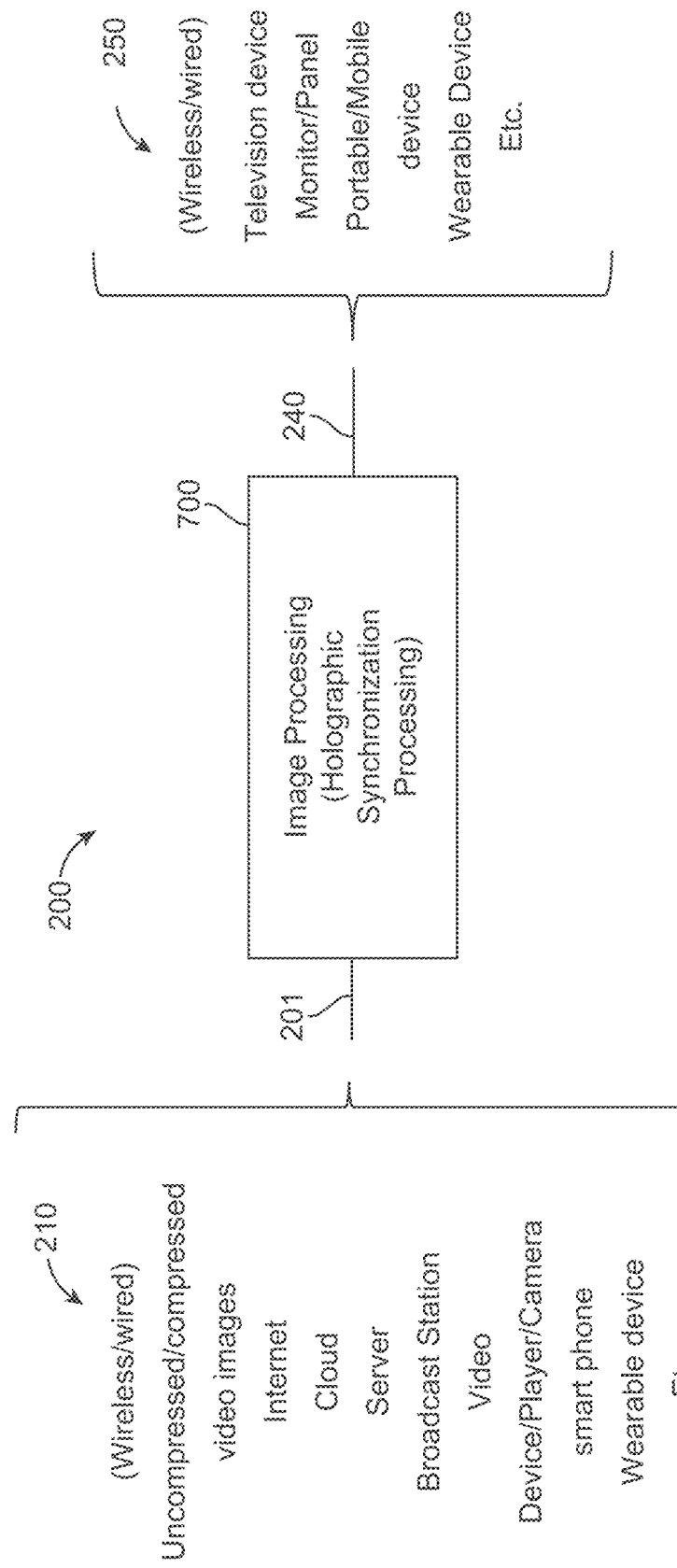
FIG. 2 shows an example high-level block diagram of a system, according to some embodiments.

FIG. 2 shows a high-level block diagram of a system 200, according to some embodiments. In some embodiments, the system 200 may process input video images from an input source 210 (or device 52 or 56, FIG. 1) received at an input node 201 (e.g., from the communication path 54, FIG. 1) using an overlay enhancement processor 700 (e.g., an integrated circuit (IC), hardware circuitry, a multi-core processor, an application specific IC (ASIC), CPU, hybrid device and application programming interface (API), etc.), output video images at the output node 240 (e.g., to the communication path 54) and display the images on an output source 250 (or device 52, FIG. 1). In some embodiments, the display for an output source 250 may be a physical device for presenting the image or multi-media presentations. For example, the display may be a screen, including a liquid crystal display (LCD) panel, a plasma screen, a projection screen, a heads-up-display (HUD), etc. In other embodiments, the display may be projected on an object or reflection device.

In some embodiments, the input video images may be provided from an input source 210, which may be transmitted/received wirelessly or through a wired interface (e.g., the communication path 54, FIG. 1) and may include uncompressed/compressed video content. In some embodiments, wireline or wireless communication of video imaging content in system 200 may include communication on/over one or more of a Ethernet, telephone (e.g., POTS), cable, powerline, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1× enhanced voice-data only (EV-DO) or 1×EV-DO Gold Multicast) system, an IEEE 802.11x system, a DMB (Digital Multimedia Broadcasting) system, an orthogonal frequency division multiple access (OFDM) system, a DVB-H (Digital Video Broadcasting-Handheld) system, etc.

In some embodiments, the video input source 210 may be transmitted over a wireless network (e.g., Internet, local area network (LAN, wide-area network (WAN), personal area network (PAN), campus wireless network (CAN), metropolitan area network (MAN), etc., e.g., the communication path 54, FIG. 1). The input source 210 may arise from a cloud-based system, a server, a broadcast station, a video device/player, a video camera, a mobile device, etc.

In some embodiments, the video image input from the input source may be decoded/encoded (e.g., via a decoder/encoder) prior to arriving at the input node 201. The video image output from the output node 240 to an output source 250 may be encoded/decoded prior to arriving at the output node 240. In some embodiments, the output source 250 may receive the output image from the output node 240 wirelessly or through a wire interface.

In some embodiments, compressed video image content from an input source 210 may provide analog or digital video from a broadcast, computer network, a DVD or other computer readable storage medium, or any other suitable source of video signals. In one embodiment, the compressed video from an input source 210 may be coupled to a receiver via a radio frequency interface (such as ATSC broadcasts), a computer network, or a wired or wireless connection such as a component video cable, a DVI or HDMI video interface, etc. In one embodiment, an uncompressed video image from an input source 210 may include one or more of a video camera, or a memory device such as a disk drive coupled to a receiver by any suitable video interface. The uncompressed video from an input source 210 may provide uncompressed video in analog or digital form including in the form of luminance and chrominance, in individual color intensities such as red, green and blue, etc., or in any other suitable format.

In some embodiments, digital video formats for input video content from an input source 210 may include different frame rates, different numbers of lines and rows of pixels, interlaced and non-interlaced, etc. For example, movies are typically produced at 24 fps (frames per second) format, NTSC is 30 frames per second and PAL is 25 frames per second. The format may be interlaced or progressive. For example, high definition formats (such as supported by digital video broadcast standards) may be modified to a format that fits the format of a display device of an output source 250. The display device of an output source 250 may be configured to receive NTSC, PAL, ATSC, DVB/T, etc.), or display device running at frame rates, such as 70 Hz, 75 Hz, 80 Hz, etc.

In some embodiments, a processor (e.g., image processing processor 700, FIG. 2, processor 1601, FIG. 16, etc.) may perform the following. One feature of some embodiments includes a screen-oriented holographic user interface (UI) experience. A holographic UI is shown that is positioned relative to the display (TV, LFD, etc.). When the user wears the HMD, they see a UI that appears to be floating outside of the display. The holographic UI provides users the ability to interact by using gestures, taps, or voice commands. Holograms may be projected relative to the display, the user, or other objects detected in the environment space (e.g. a coffee table, etc.). The UI may be scaled according to the size of the display, providing for the effect of the UI "surrounding" the display.

In some embodiments, interactions with the holograms may affect the display itself. For example, selecting a holographic menu item may launch an application on the display. Users may use the entirety of the environmental space they are inside (e.g., a room, etc.) to view menus, and retain the ability to watch video content on the higher-resolution display. In some embodiments, the UI may include holograms that are presented in the form of "tiles" or rectangles that can be selected in order to perform an action. Holograms such as tiles may be generated from data that the display sends. For example, the display may send information about its size, allowing holograms to "surround" the display, or it may send information about apps or content available on the display, providing the HMD to generate holograms that allow the user to open those apps or play the content. Holograms may be interacted with via actions such as gazing (short and long gaze), tapping (using finger gesture), voice commands, etc.

In some embodiments, detecting the position of the display is performed by using augmented reality (AR) Tracking. In order for a holographic UI to be positioned relative the display, the HMD must first know the displays' position. In some embodiments, determining the displays' position may be accomplished using AR tracking. The display may show a pattern on its screen that allows the HMD to recognize it using computer vision, and determine its position in world space. In addition to determining the position of the display, the HMD also receives information necessary to determine the display's dimensions.

In some embodiments, content-aware holographic asset insertion for entertainment (e.g. content video, games, etc.) is provided. The display and HMD communicate with each other to synchronize the display of 3D holographic assets with video and other content. Examples may include content video. For example, a movie begins playing on the display. At certain time indexes in the movie, the display instructs the HMD to display holograms related to the scenes of the movie, increasing user immersion. Another example is gaming where a game is being played on the display. The display instructs the HMD to play effects relevant to what is occurring in the game.

In some embodiments, dynamic advertisement insertion (DAI) using a 3D holographic asset server or store (e.g., 3D asset store 1250, FIG. 12) for holograms in the HMD is provided. In traditional video applications, a targeted advertisement can be served and shown to a user dynamically based on the user's profiling data. These advertisements are typically in 2D video formats. In some embodiments, the user experience with advertisements is enhanced using 3D holographic assets. Given a user's profiling data on both the display and HMD, the display and HMD coordinate to retrieve and render an advertisement in the form of a holographic asset into the user's HMD virtual environment. For example, dynamically inserting 3D holographic ad objects (e.g. RED BULL® airplane flying around in your HMD display while a RED BULL® advertisement is shown on a TV screen (see, e.g., FIG. 10).

In some embodiments, the display and HMD dynamically pull holographic assets from an asset pool/store. The DAI is available via linear, live, or video on demand (VOD) content. 3D holographic product placement is provided, which allows an online purchase (e.g., a holographic RED BULL® drink placed on top of a coffee table in front of a TV, FIG. 10). The user can interact with the RED BULL® drink to purchase via online for delivery to your house). This user interaction provides the user an immersive experience when viewing the holographic asset with the intent of making the advertisement more effective. In one example, content video is playing on a visual display. At a given time, the visual display will instruct the HMD to insert dynamic advertisements in the form of holograms related to the content video. The holograms are then synchronized with video on the display.

In some embodiments, holographic asset insertion is provided for E-commerce shopping experiences. In traditional shopping experiences, sellable products, experiences, services, etc., are shown to consumers in the form of text, images, and videos. The shopping experience may be enhanced using holographic assets, holograms allowing users to experience a product, experience, service, etc. in a virtual space with a more accurate impression. Users in the virtual environment of the HMD are able to walk around in a real physical space to visualize and/or control a 3D virtualized representation of a product, experience, service, etc. The intent is to provide the user with a better understanding before making a purchase. The display and HMD pull holographic assets from an asset pool/store. Payment may be made in the display or HMD device by means of e-commerce (e.g., Samsung Pay). During a user's interactions with the display, products may show up on the screen or in a video. The display communicates with the HMD about products being shown on the screen, and the HMD projects holograms relating to what is shown on the display, allowing the user to interact with and purchase products. In one example, a user interacts with the display and uses the HMD device. A holographic asset is inserted in the user's virtual environment with the option to be purchased. The user is able to visualize, walk around, and interact with the scaled product, experience, service, etc. A user may purchase the product, experience, service, etc. Examples of items that may be purchased include, but are not limited to, general products, consumer electronics, appliances, music, food, vehicles, fashion, furniture, travel destinations, local services, etc.

In some embodiments, a social TV platform is provided that uses virtual avatars in a holographic environment. With the Social TV Platform, users are able to watch video content and communicate with each other, without being in the same real physical space. The purpose is to enhance the social experience surrounding today's TV display. Each user will be able to join a "virtual room" to view the same video content. The same video content is synchronously displayed on each user's display device. Users in a given "virtual room" are able to control the video content. Each user may be represented as a "virtual avatar." A virtual avatar is a virtual representation of the user. Users in a "virtual room" are able to uniquely identify each other by the design of their virtual avatar. Given the sensors on the HMD device (e.g., accelerometer, gyroscope, compass, etc.), the virtual avatar is capable of mimicking the head movement of the user, to provide a realistic representation of the direction in which a user is gazing. Users in a "virtual room" are able to communicate with each other via voice, which may optionally trigger a mouth animation on the virtual avatar. Users in the social TV platform are able to add/remove each other via a "friend list." Virtual avatars may be positioned relative to the display device (e.g., the TV, etc.).

In some embodiments, a mixed reality ecosystem for a holographic app and asset store is provided. The MR ecosystem may be composed of an HMD (e.g., HMD 320, FIG. 3, HMD device 1220, FIG. 12), a TV or media device (e.g., TV device 250, FIG. 2, TV device 310, FIG. 3, media device 1210, FIG. 12), a holographic app store, and a holographic 3D asset-store (e.g., 3D asset store 1250, FIG. 12). In some embodiments, there are several entities that interact with the ecosystem such as application software developers for TV and HMD platforms, 3D holographic asset developers, publishers (for DAI scenarios), and TV viewers. An app developer builds TV web application for TV and media device sand submits the TV web application to a TV app store. An app developer builds UI applications for the HMD and submits this companion app to the holographic app store. The holographic apps may be downloaded from the holographic app store into the HMD device. The holographic apps have a holographic client software library as part of the application. A TV-side holographic client software app or module exists as part of the TV firmware. A holographic 3D asset server may be a CDN Http server which contains various (unity) asset bundles for content video developed by 3D holographic asset developers around the world. A Publisher may decide when to dynamically insert/render 3D holographic objects during content playback.

In some embodiments, a business model for the holographic app and asset store creates a holographic 3D asset-store similarly as a popular music app store would, to allow app developers to purchase holographic objects with imaginative effects to enhance the viewing experience for their apps. The new asset-store system provides for any 3D holographic asset developer to create, submit, and sell their assets for holographic apps.

Figure 3:
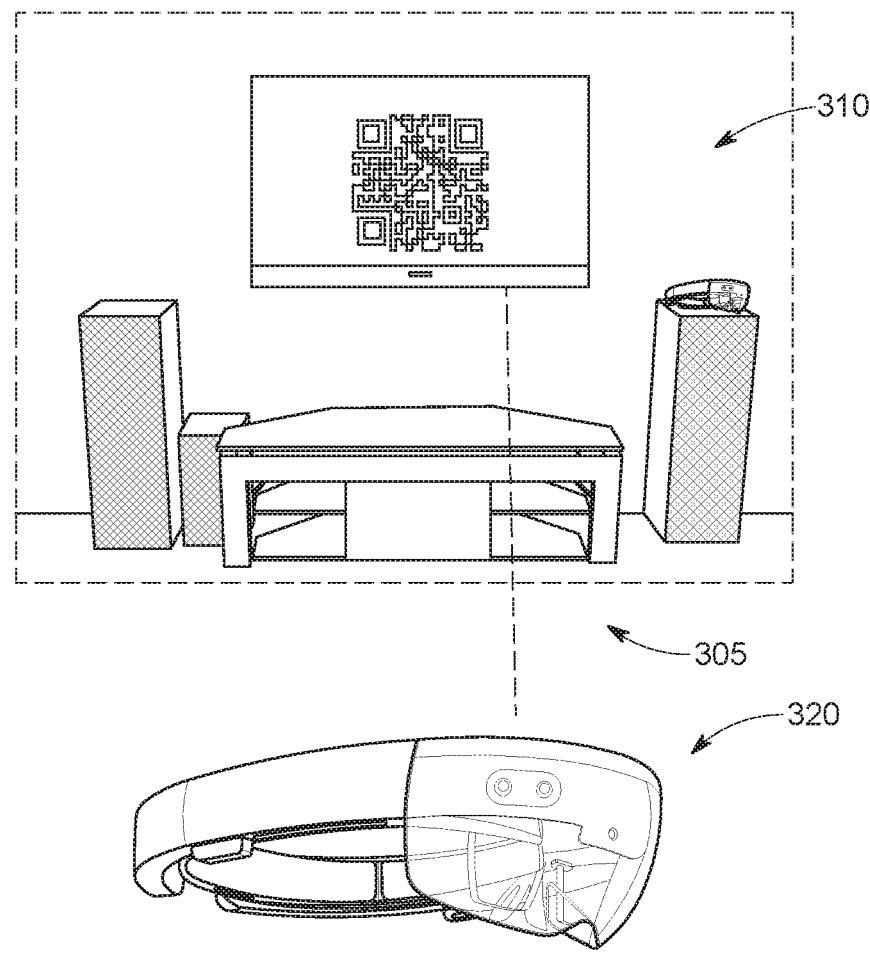
FIG. 3 shows an example television (TV) device and holographic display device discovery and pairing, according to some embodiments.

FIG. 3 shows an example TV device 310 and HMD 320 discovery and pairing, according to some embodiments. In some embodiments, the HMD 320 must learn of the existence of the TV device 310, and connect to it. In one embodiment, the device discovery may use simple service discovery protocol, but discovery may also be achieved through mDNS and other services. The HMD 320 must then connect to the TV device 310 and network with it. This is called device pairing. Pairing may be accomplished through WiFi. Bidirectional communication 305 is possible between the HMD 320 and the TV device 310. The HMD 320 then signals to the TV device 310 that it is attempting to discover the position of the TV device 310 in space. The TV device 310 then displays a pattern (e.g., a QR code, a static or dynamic pattern, etc.) on its screen that the HMD 320 can recognize through computer vision. The HMD recognizes the pattern and learns the position of the TV device 310 in space. At this point it is possible for the HMD 320 to create a holographic UI that is positioned relative to the display of the TV device 310. The HMD 320 can utilize its connection to the TV device 310 in order to send commands or retrieve information about the state of the TV device 310. For example, a holographic controller may be tightly integrated with the TV device 310 UI (e.g., a Smart Hub UI in a Samsung Smart TV) to handle navigation, focus, content selection, etc. The holographic controller follows a strict messaging protocol and handles messages between the TV device 310 and MR devices: The messages will provide various functionality, such as remote app launching, remote game launching, volume control, video control (e.g., play, pause, stop, fast forward, and rewind), content selection from a TV device 310 UI, synchronized navigation, channel control, etc. The TV device 310 also sends commands to the HMD 320. As an example, the TV device 310 may be playing a movie on its screen. The TV device 310 reads metadata about the movie being played that describes holograms to be inserted along with the movie content. Due to this metadata, the TV device 310 knows at what time certain scenes or events occur in the movie. At the appropriate time, the TV device 310 signals to the HMD 320 to begin loading and caching holographic assets. Finally, the TV device 310 may signal the HMD 320 to play the holographic assets synchronized with the video on the TV device 310.

In some embodiments, a holographic app discovers the TV device 310 on a local network using SSDP protocol. The holographic app establishes a connection to the TV device 310 and pairs with it. The TV device 310 recognizes a new holographic app connection and opens a pairing app. The pairing app shows an image on the TV device 310. The holographic app recognizes the image and determines the location of the TV device 310 in 3D space. Using an ARToolkit library (a software library for building augmented reality applications), the holographic app uses image/pattern recognition to scan the image that the TV device 310 pairing app displays on the screen. Once the pattern is scanned, the holographic app becomes aware of the location of the TV device 310 in the user's room. Then, the holographic app saves the location of the TV device 310 inside of its anchor store and uses this information each time the holographic app is launched.

Figure 4:
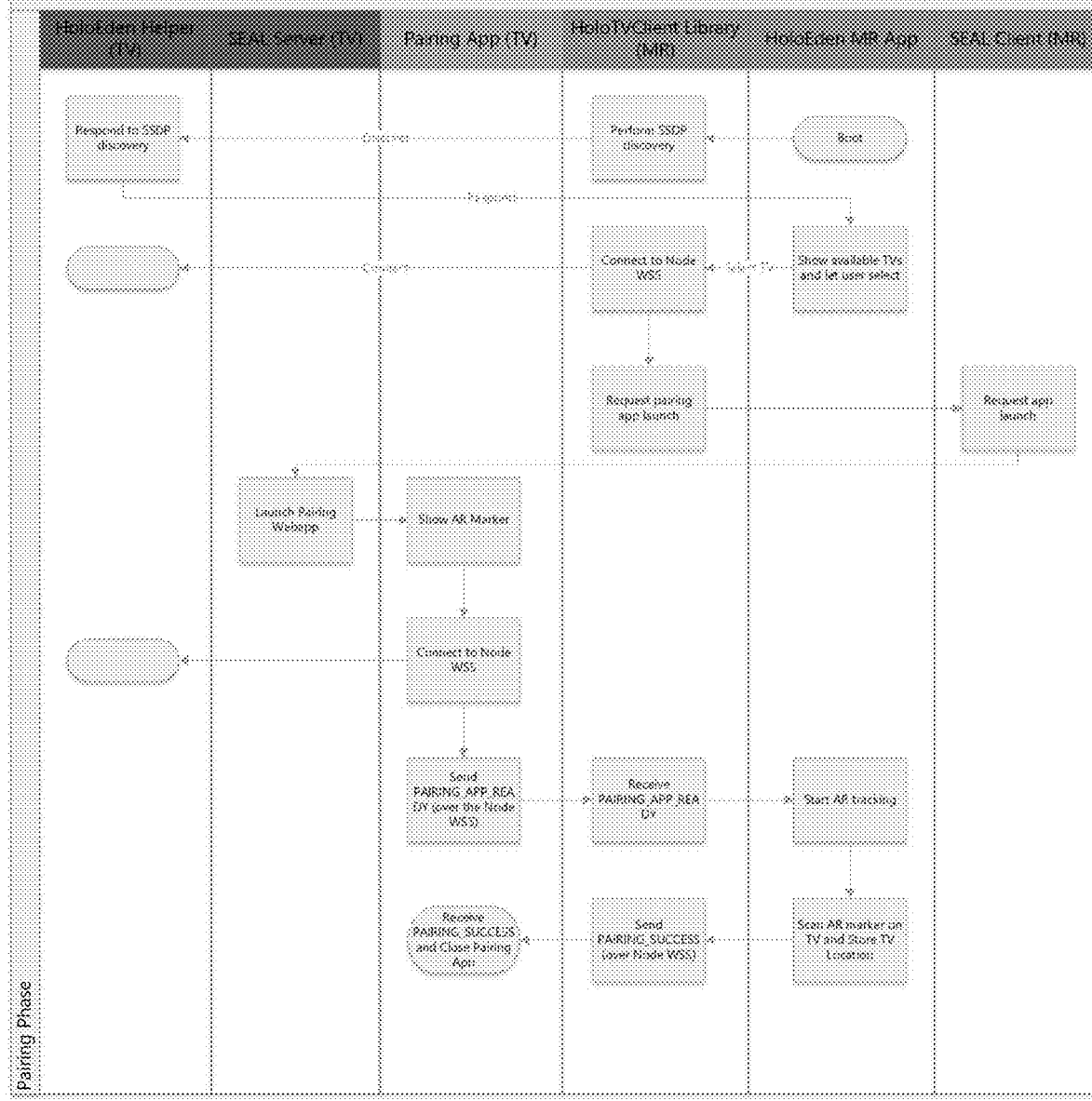
FIG. 4 shows a mixed reality (MR) framework pairing flow diagram, according to some embodiments.

FIG. 4 shows an MR framework pairing flow diagram 400, according to some embodiments. The flow diagram 400 describes the device discovery and pairing process between the TV device (e.g., TV device 310, FIG. 3) and the HMD (e.g., HMD 320, FIG. 3). Both a holographic app helper (e.g., HoloEden Helper 410) and SEAL server 420, and the pairing App (e.g., pairing app 430) are software on the TV device and the holographic client (e.g., HoloTVClient library 440, and the holographic MR app (e.g., HoloEden MR app 450) and the SEAL Client 460 are software running on HMD device.

Figure 5:
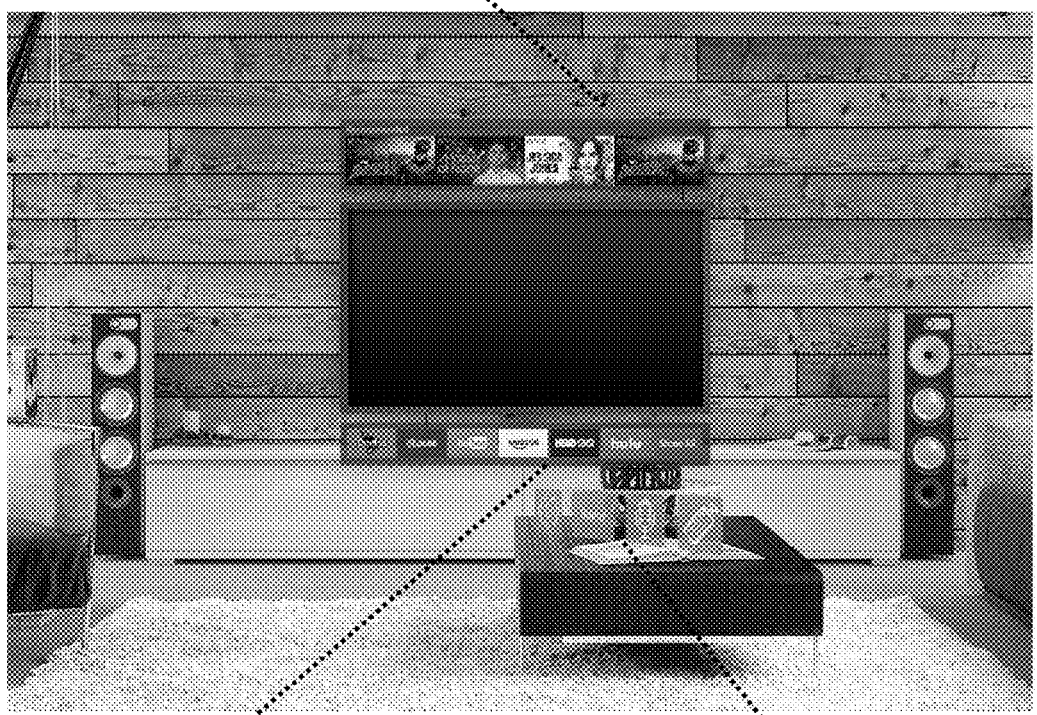
FIG. 5 shows an example holograph app user interface (UI), according to some embodiments.

FIG. 5 shows an example holograph app UI 520, according to some embodiments. The example UI menu holographs created by the HoloLens app. HoloLens app communicates with the TV device 310 via network to access TV metadata information using an application programming interface (API) (e.g., an Eden API). For example, the holographic app obtains a listing of apps installed on the TV device 310, movie assets, title, etc. A combination of the results of AR tracking and the display sending information about itself (for example, its screen size) allow holograms to be generated for holographic display around the TV device 310. Holograms are positioned next to the TV device 310, producing an effect of the UI "surrounding" the display. Note that the UI shows apps 520 and content (e.g., recommended media 510) that are available on the display. Interacting with the holographic tiles can trigger playback of content on the display. There are also holograms for settings and controls 530 including a virtual remote control, voice control, and other icons positioned on the table in the room, made possible through utilizing room-sensing technology on the holographic projection device (e.g., HMD device 320, FIG. 3).

In some embodiments, recommended media 510 is shown as a top panel, and provides suggestions based on viewer trends. Holographic apps 520 include user apps and games that appear in the menu below the screen. The selected app will appear to whichever side of the TV device 310 that best suits the user. Advertising (e.g., Tile Ads) opportunities appear to the left. Settings and controls 530 include settings, source, voice command and virtual remote are accessed from these panels.

Figure 6:
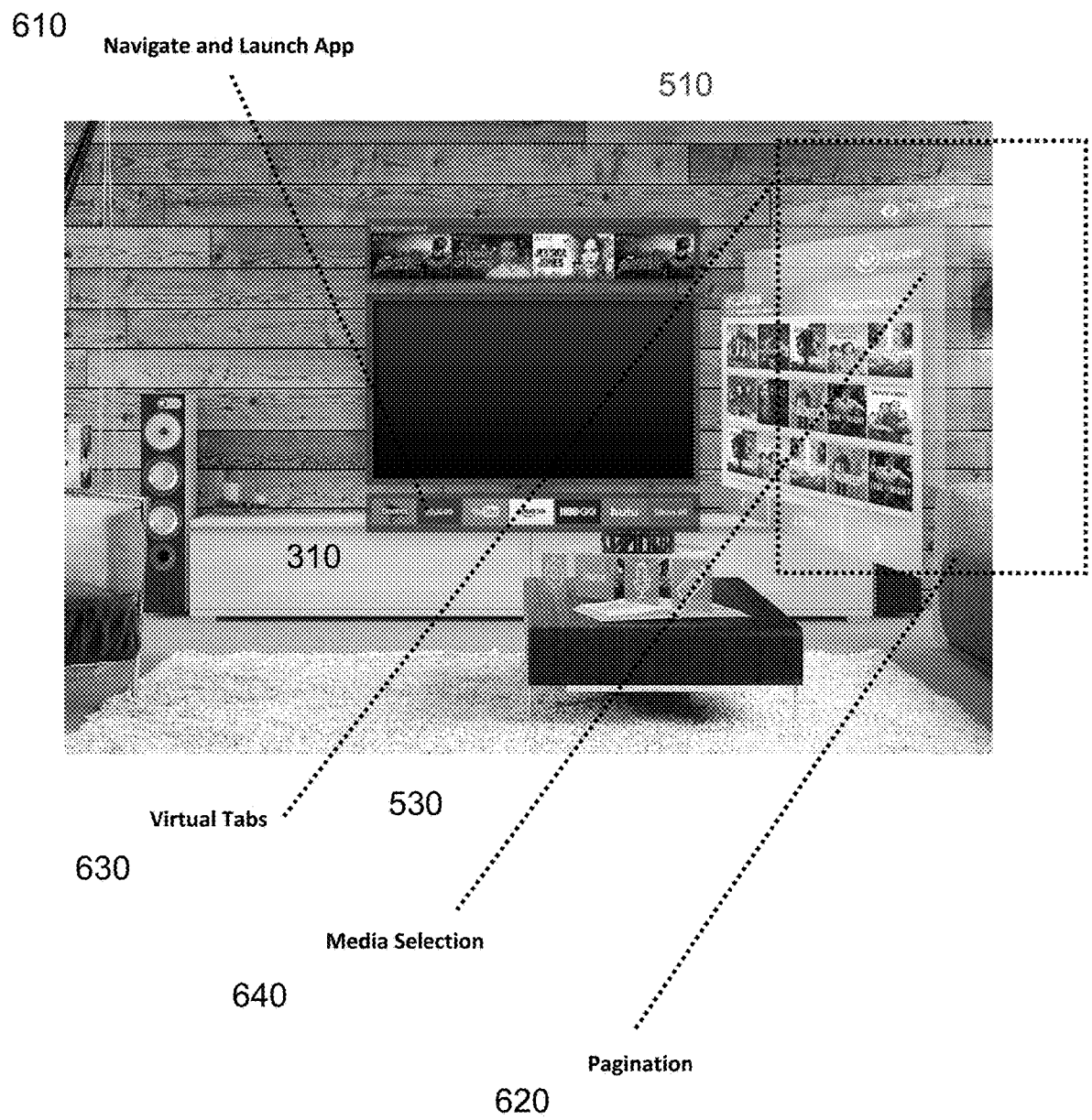
FIG. 6 shows a virtual TV UI panel, according to some embodiments.

FIG. 6 shows a virtual TV UI panel, according to some embodiments. The holographic navigate and launch app 610 navigates via gazing, and tapping a selection (e.g., using a finger gesture) will bring up the application. The holographic pagination 620 provides for users to advance through the media library. The virtual tabs 630 holographic provides for users to switch between TV Shows, movies and recommended media 510 by gazing at these tabs until a timer icon animates. The holographic for media selection 640 provides for navigation via gazing, and tapping a selection brings up the preview panel.

Figure 7:
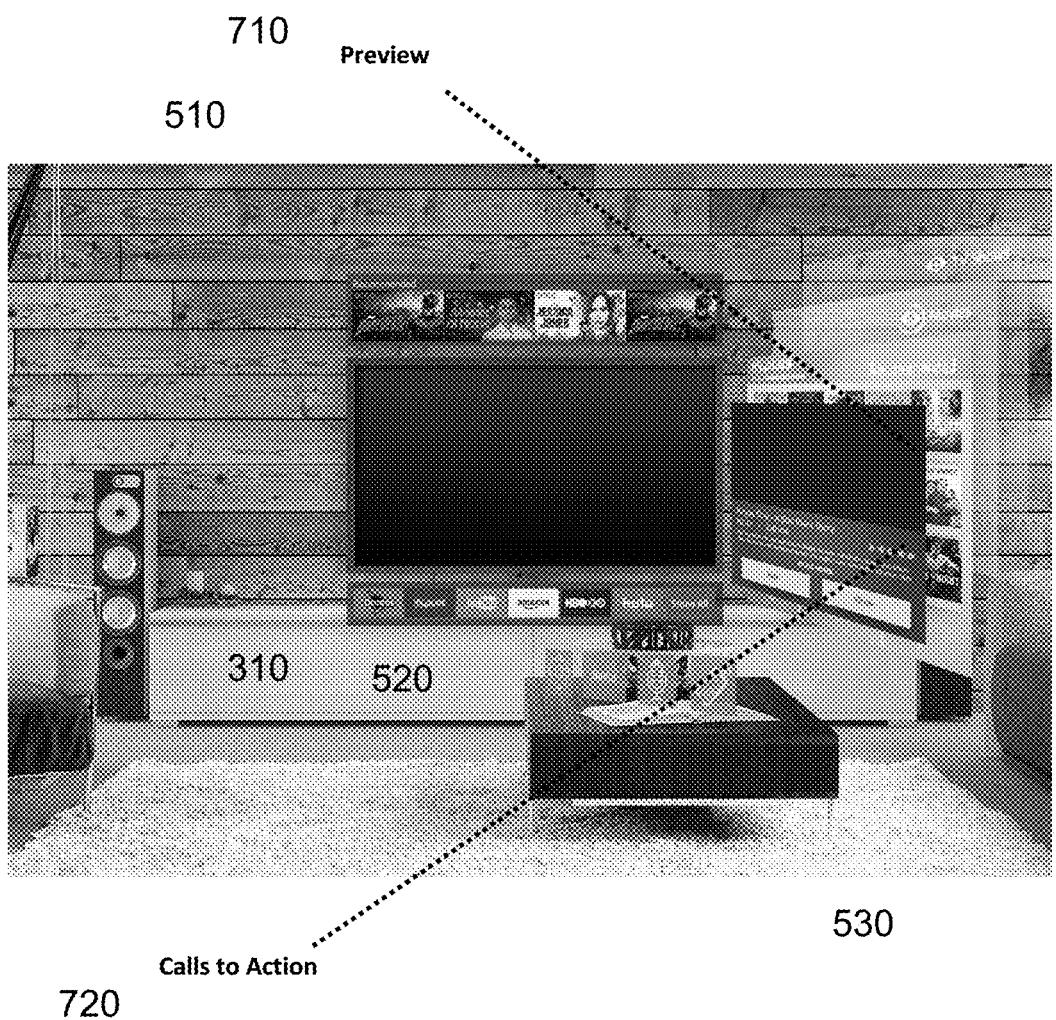
FIG. 7 shows a virtual preview panel, according to some embodiments.

FIG. 7 shows a virtual preview panel 710, according to some embodiments. The preview panel 710 begins automatically. The holographic for calls to action 720 provides for users to tap to either expand the information section, make a purchase or close the preview panel.

Figure 8:
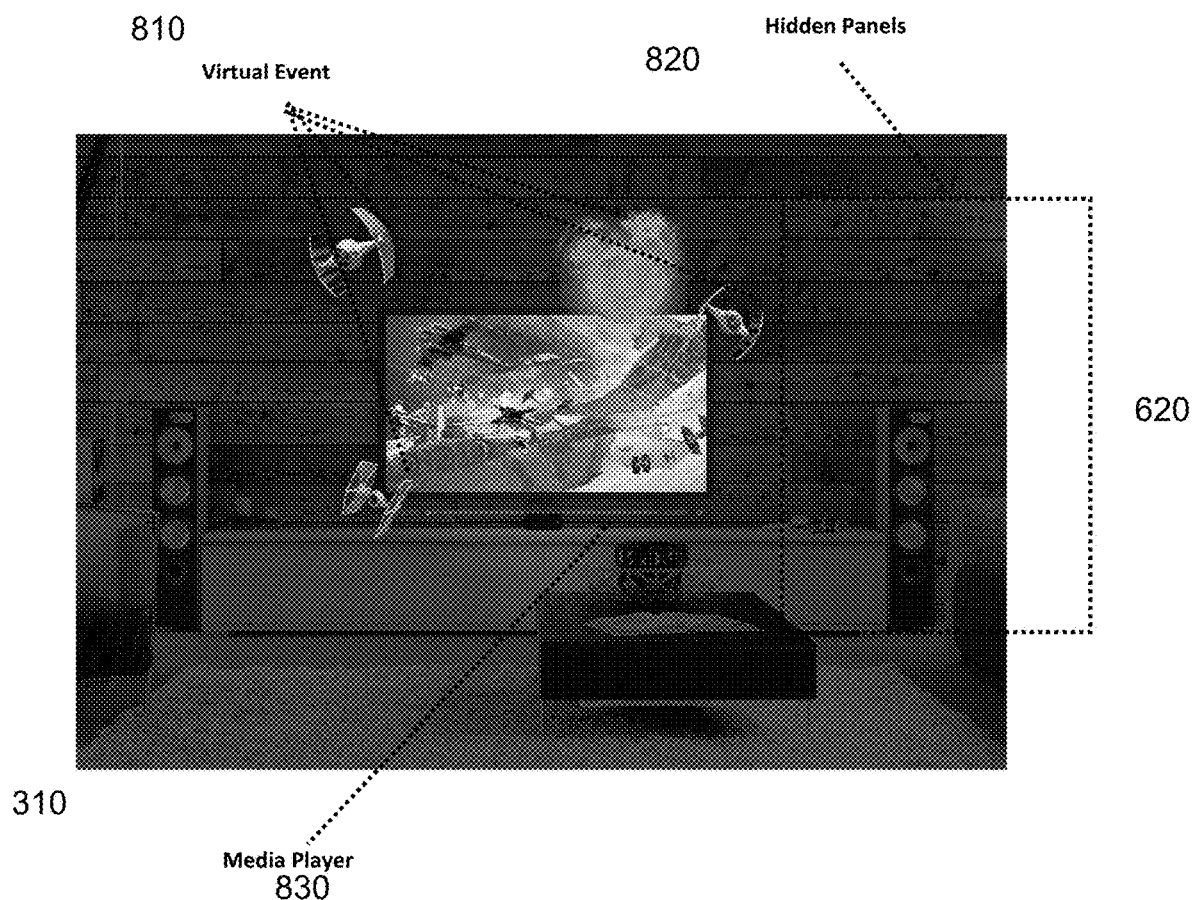
FIG. 8 shows an example movie event holographic display, according to some embodiments.

FIG. 8 shows an example movie event holographic display, according to some embodiments. The holographic virtual event 810 provides that during key moments in a movie, virtual events may occur outside the screen of the TV device 310 and even be interacted with. Here, the user may use the HMD device 310 (FIG. 3) reticle to fire upon, for example, spaceships. In this example, during media mode, the holographic panels (e.g., pagination 620) are hidden for the user (hidden panels 820). Closing the movie will reveal the panels that were previously displayed. The holographic for the media player 830 show as a transparent media bar and displays media time and options. In some embodiments, the media player 830 becomes fully opaque once the user gazes at it.

Figure 9:
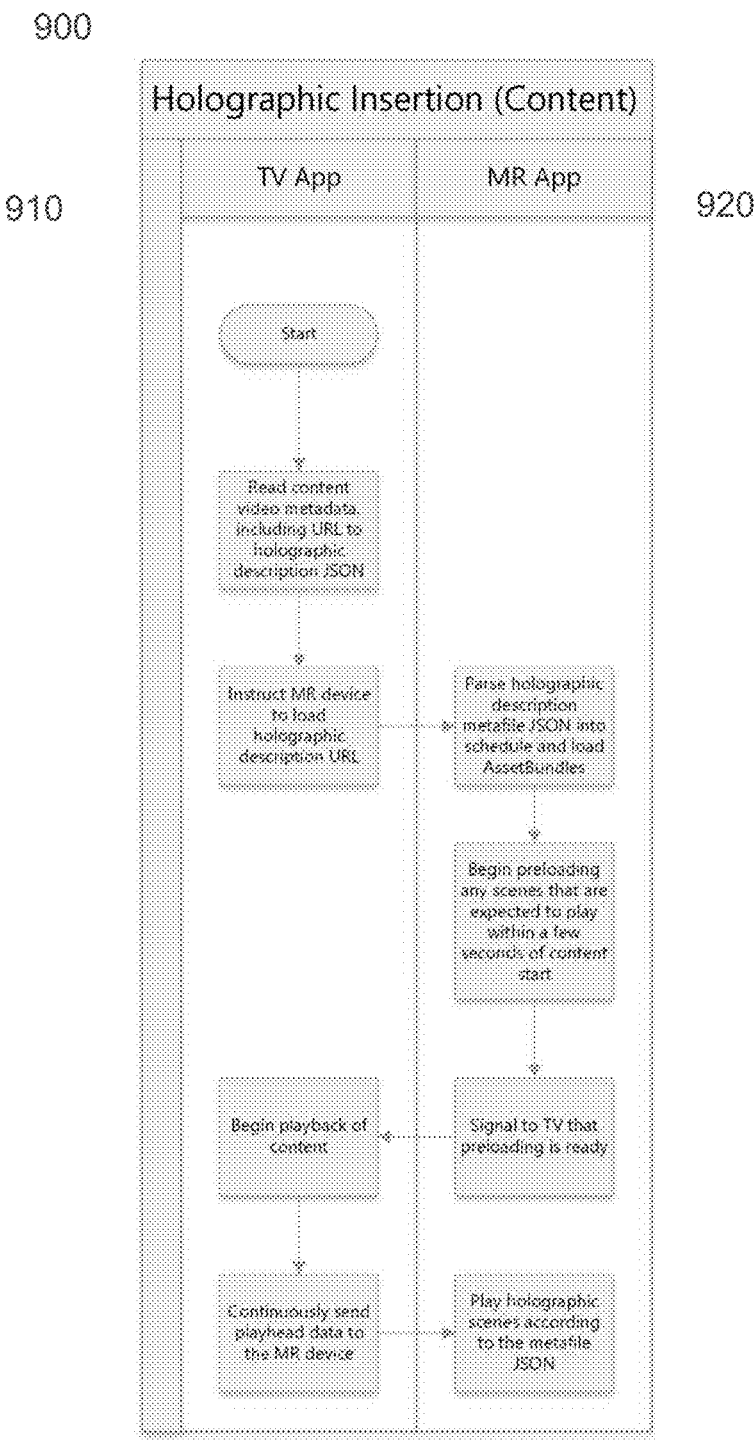
FIG. 9 shows a block diagram for holographic object insertion processing, according to some embodiments.

FIG. 9 shows a block diagram 900 for holographic object insertion processing, according to some embodiments. TV app processing 910 is shown on the left and the MR app 920 processing is shown on the right. In some embodiments, the TV app 910 reads content video metadata including a URL to a holographic description JSON. The MR device (e.g., HMD 320, FIG. 3) is instructed to load a holographic description URL. The MR app 920 then parses the holographic description metafile JSON into the schedule and loads asset bundles. The MR app 920 begins preloading and scenes that are expected to play within a few seconds of the content starting. The MR app 920 signals to the TV device (e.g., TV device 310, FIG. 3) that preloading is ready. The TV app 910 begins playback of the content and continuously sends play head data to the MR device. The MR app 920 plays holographic scenes according to the metafile JSON.

Figure 10:
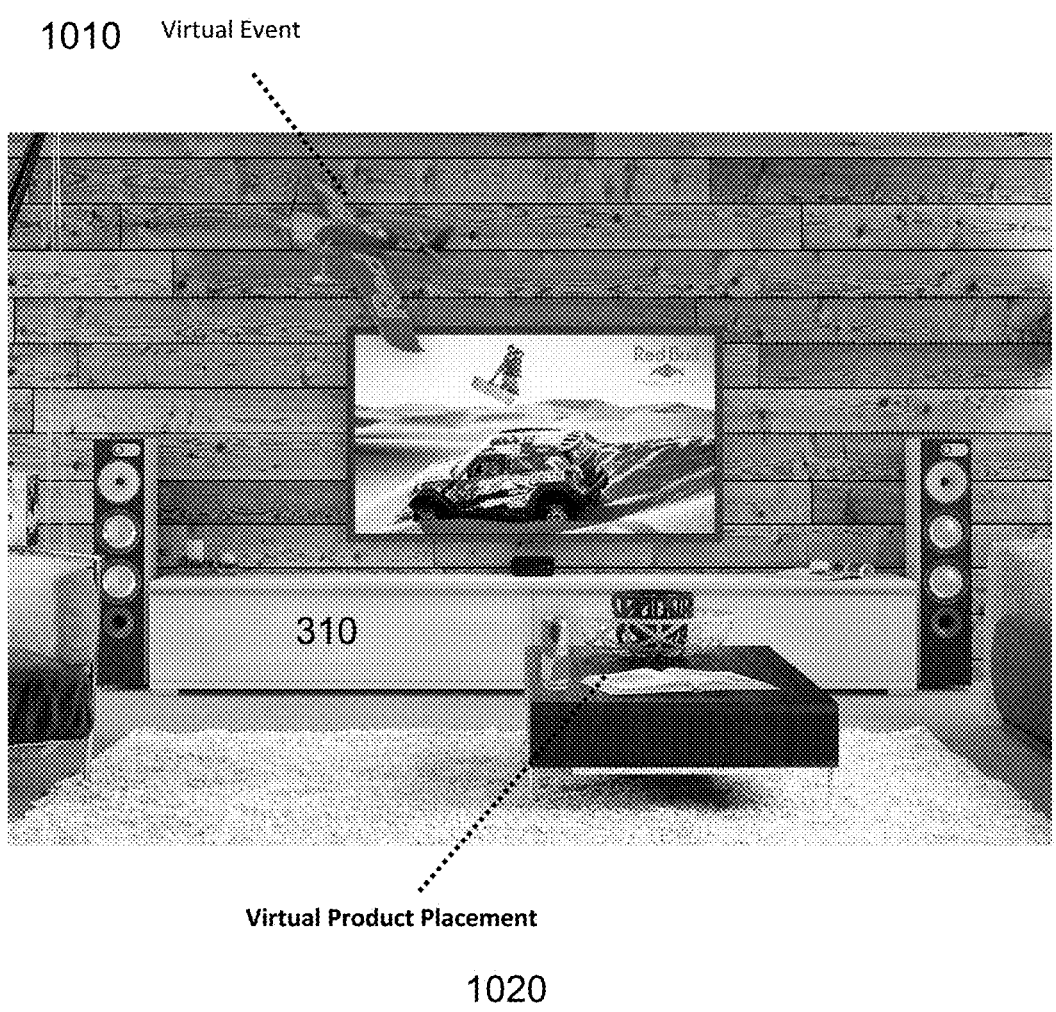
FIG. 10 shows an example of dynamic advertising insertion in a virtual world environment, according to some embodiments.

FIG. 10 shows an example of dynamic advertising insertion in a virtual world environment, according to some embodiments. During key moments in a commercial, virtual events may occur outside the screen and even be interacted with. The holographic virtual event 1010 shows a RED BULL® airplane flying around the room environment outside of the display of the TV device 310. Products displayed in commercials and movies may be placed in the user's environment and shown as holographic virtual product placement 1020. In this example, the virtual product placement 1020 includes a can of RED BULL® placed on a table in front of the TV device 310.

Figure 11:
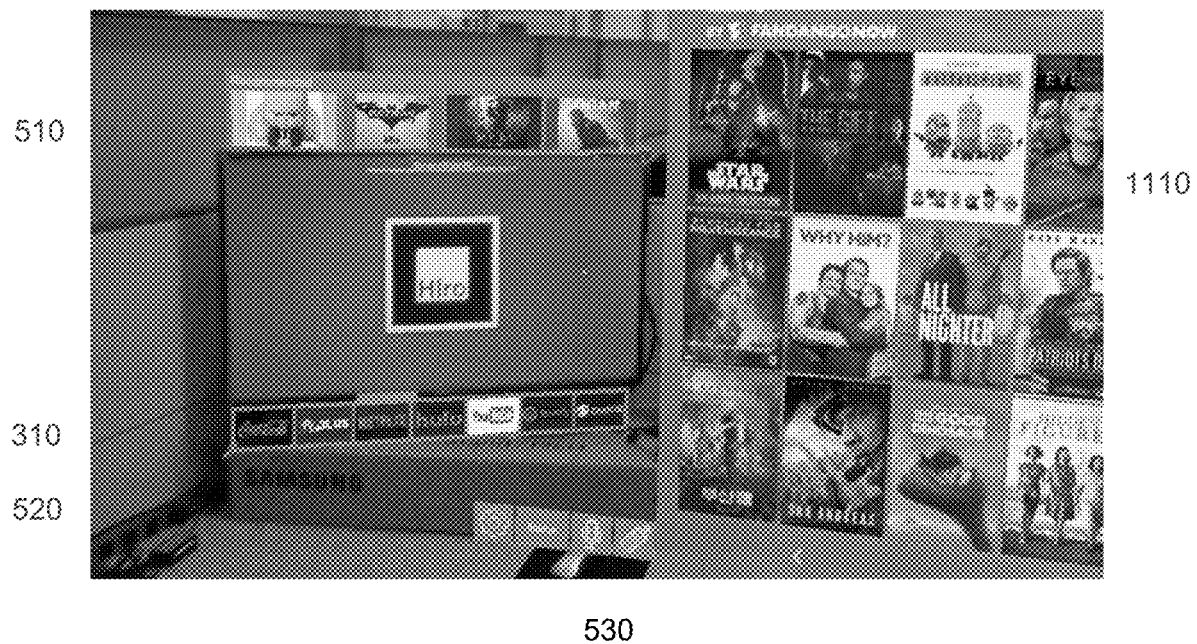
FIG. 11 shows an example of a smart TV and UI, according to some embodiments.

FIG. 11 shows an example of a smart TV (TV device 310) and UI, according to some embodiments. In this example, the holographic recommended media 510, control and settings 530, apps 520 and content selection 1110 are shown (via the HMD 320, FIG. 3). As can be seen, the collection of the holographic displays frees the TV device 310 from showing these UIs and provides for varied placement and sizing for the different UIs.

Figure 12:
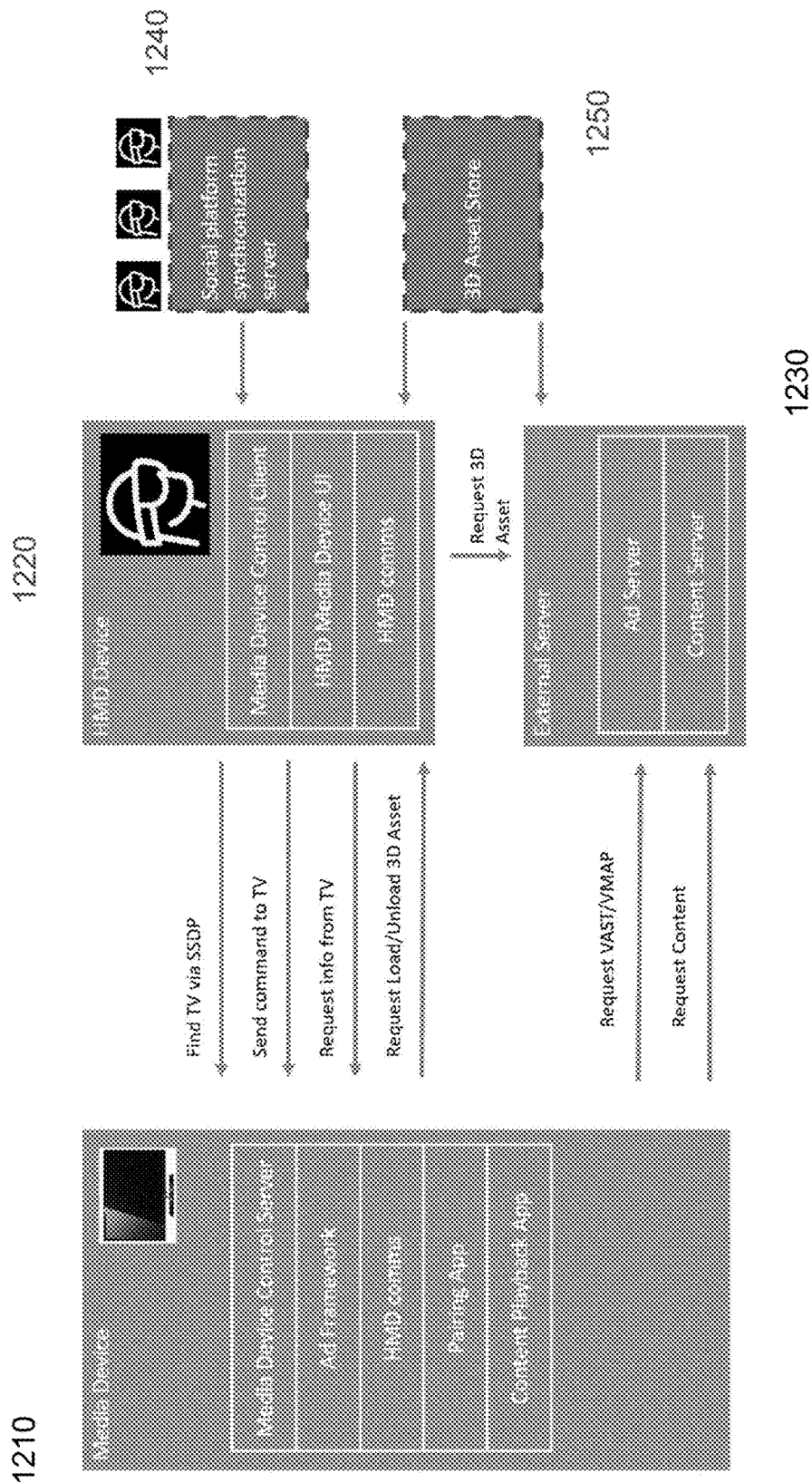
FIG. 12 shows a block diagram of an example system layout, according to some embodiments.

FIG. 12 shows a block diagram of an example system layout, according to some embodiments. The system includes a media device 1210 (e.g., a TV device, screen device, monitor, etc.), an HMD device 1220 (e.g., similar to HMD device 320, FIG. 3), an external server 1230, a social platform synchronization server 1240 and a 3D asset store 1250.

In some embodiments, the media device 1210 may include a media device control server, an ad framework, HMD communications (comms), a pairing app and a content playback app. The media device control server provides control of some media device functions. The ad framework may be a preexisting dynamic ad insertion framework, which is extended to handle reading metadata files for loading holographic content. The HMD comms is a communication protocol peer client that sends and receives messages between the HMD device 1220 and the media device 1210. The pairing app reads information about the media device 1210 and presents a marker for the HMD device 1220 to pinpoint a physical location of the media device 1210. The content playback app is a custom video playback application that reads metadata files for synchronization of 3D content, and incorporates the ad framework for synchronized ad playback. The media device 1210 requests load/unload of a 3D asset from/to the HMD device 1220, requests video ad serving template (VAST) and video multiple ad playlist (VMAP) from the external server 1230, and requests content from the external server 1230.

In some embodiments, the HMD device 1220 may include a media device control client, an HMD media device UI and HMD comms. In one embodiment, the media device control client is an HMD device 1220 side media device communication client that listens for messages from the media device 1210. The HMD media device UI is a 3D graphical user interface (GUI) that extends the media device 1210 UI into the user's physical space. The user physically interacts with the HMD media device UI when using the HMD device 1220. The HMD device 1220 finds the TV (media device 1210), sends commands to the TV and requests information (e.g., metadata) from the TV. The HMD device 1220 requests a 3D asset from the external server 1230.

In some embodiments, the external server 1230 may include an ad server and a content server. The ad server that includes metadata for a 3D ad when serving ads to the media device 1210. The content server is a server hosting video/audio content.

In some embodiments, the 3D asset store 1250 may be a business ecosystem allowing content creators and publishers to promote and share 3D content. The 3D asset store may be consumed by users, advertisers, publishers.

In some embodiments, the social platform synchronization server 1240 handles synchronization of user group activities.

In some embodiments, holograms may not be projected from the HMD device 1220, but instead there may be a separate device in the room, on the user's person, or even integrated into the screen itself. The content synchronization aspect and learning of the display's position in space is similar as with the HMD device 1220. The screen and holographic projection device may synchronize with each other over the Internet, BLUETOOTH®, or other communication technology, instead of over WiFi.

Figure 13:
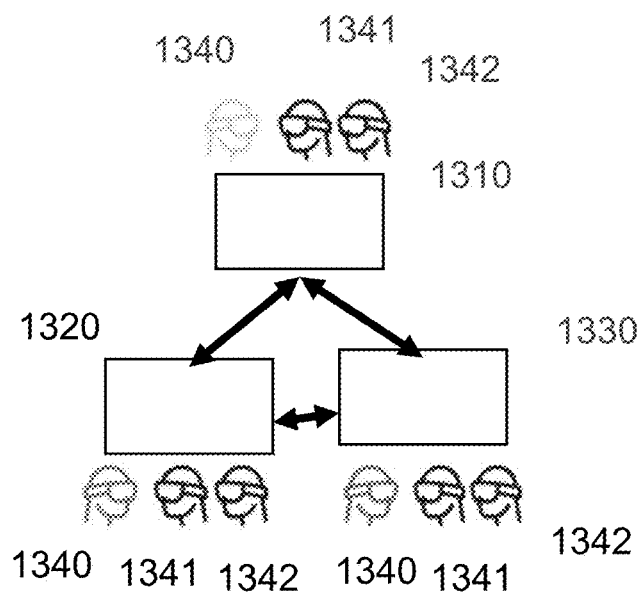
FIG. 13 shows an example diagram showing the sharing of a viewing experience by synchronizing media devices and projecting avatars in respective space, according to some embodiments.

FIG. 13 shows an example diagram showing the sharing of a viewing experience by synchronizing media devices and projecting avatars in respective space, according to some embodiments. In this example, there are three TV devices 1310, 1320 and 1330, which each have respective viewers that have virtual avatars (avatars 1340, 1341 and 1342). With a social TV platform using the social platform synchronization server 1240 (FIG. 12), users are able to watch video content on their respective TV device and communicate with each other, without being in the same real physical space. Each user joins a "virtual room" to view the same video content that is synchronized for the TV devices 1310, 1320 and 1330. The respective users in a given "virtual room" control the video content. Users in a "virtual room" are able to uniquely identify each other by the design of their virtual avatar. Each respective user wears a respective HMD device (e.g., HMD device 320, FIG. 3, HMD device 1220, FIG. 12) that includes sensors (e.g., accelerometer, gyroscope, compass, etc.) that track head movements and position of the wearer. The virtual avatars (1340, 1341 and 1342) portray the head movement of the user where the avatar is facing a respective direction in which a user is gazing. The respective users in a "virtual room" are able to speak and hear the other users. Users in the social TV platform are able to add/remove each other via a "friend list." Virtual avatars may be positioned relative to the display device (e.g., the TV, etc.) in the virtual room.

Figure 14:
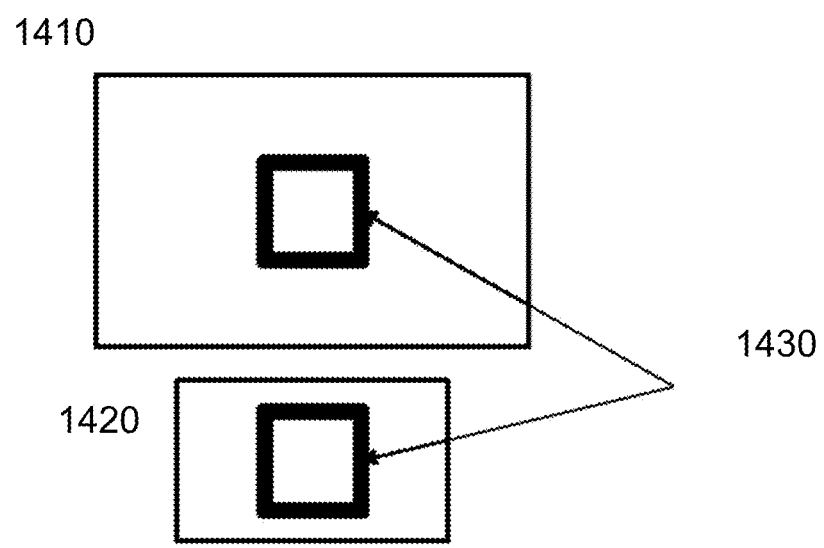
FIG. 14 shows use of simultaneous visual input and network communication for providing precise determination of distance and position in 3D space, according to some embodiments.

FIG. 14 shows use of simultaneous visual input and network communication for providing precise determination of distance and position in 3D space, according to some embodiments. In one example, the TV device 1410 includes content 1430, and the TYV device 1420 also includes content 1430. In some embodiments, detecting the position of the display is performed by using AR tracking. In some embodiments, determining the displays' position may be accomplished using AR tracking. The HMD (e.g., HMD 320, FIG. 3, HMD device 1220, FIG. 12) recognizes the content 1430 using computer vision, and determines its position in world space. In addition to determining the position of the display, the HMD also receives information necessary to determine the display's dimensions. The HMD devices for each TV device 1410 and 1420 is able to determine the size and shape of the holograms to display based on determination of display size, position and content position.

Figure 15:
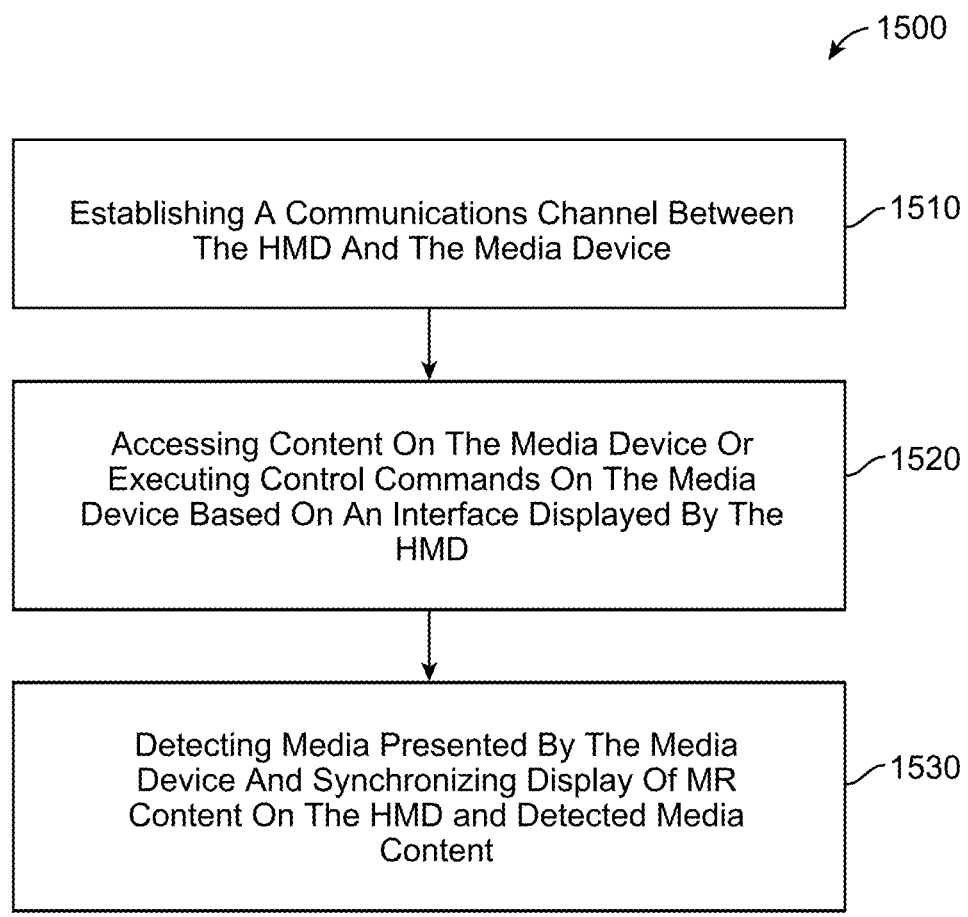
FIG. 15 shows a block diagram for synchronizing holographic content with display and UI technology processing, according to some embodiments.

FIG. 15 shows a block diagram of a process 1500 for coordinating an MR configured HMD with a separate media device to enable a synchronized user experience, according to some embodiments. In one embodiment, in block 1510 the process 1500 includes establishing a communication channel (e.g., a wireless channel) between the HMD (e.g., HMD 320, FIG. 3, HMD 1220, FIG. 12) and the media device (e.g., TV device 310, FIG. 3, media device 1210, FIG. 12). In block 1520 the process 1500 includes performing, via the communication channel, accessing content on the media device or executing control commands on the media device based on an interface (e.g., a holographic UI) displayed by the HMD. In block 1530, the process 1500 may perform, via the communication channel, detection of media (e.g., media/video/audio content), presented by the media device and synchronization of the display of content (e.g., holographic content) associated with the detected media on the HMD.

In some embodiments, for process 1500 the media device is a display device or an audio device. The HMD displays a holographic UI associated with the media device. The holographic UI includes selectable UI elements (e.g., tiles, pages, etc.) for at least one of: accessing applications (e.g., a UI of apps for selection/execution) on the media device, accessing other content on the media device (e.g., movies, suggested content, etc.), controlling settings of the media device (e.g., remote control type selections) or modifying settings on the media device (e.g., TV settings, such as source, TV settings, microphone, etc.).

In some embodiments, process 1500 may further include dynamically generating a holographic asset (e.g., a holographic flying airplane shown in the room environment) based on and associated with the media content (e.g., an advertisement, commercial, movie, etc.) presented by the media device. Process 1500 may also include that the media content presented by the media device is synchronized with display of the holographic asset on the HMD. In one embodiment, the MR content on the HMD includes the holographic asset.

In some embodiments, for process 1500 the holographic asset is retrieved from a holographic asset store (e.g., 3D asset store 1250, FIG. 12) that maintains holographic assets. The holographic assets may be sold and loaded to an HMD while the HMD views content on the media device.

In some embodiments, for process 1500 a timing for loading the holographic asset while the HMD views content on the media device is specified by metadata provided by a third party associated with the holographic asset. The media device instructs the HMD to load the holographic asset based on the timing specified by the metadata.

In some embodiments, for process 1500 the holographic asset may be an interactive advertisement that is dynamically inserted via the HMD upon a triggered event by the media device. The holographic asset is retrieved from a holographic asset store and selected based on user profiling data.

In some embodiments, for process 1500 the holographic asset triggered by the media device is used to enhance e-commerce shopping experiences by providing interaction with the holographic asset. Upon detection of the interaction with the holographic asset via the HMD, an option is presented to execute an action to facilitate a transaction associated with the holographic asset.

In some embodiments, process 1500 may further include providing one or more holographic avatars using the HMD for other users engaged in an active communication session with a user of the HMD. At least some of the users are at physical remote locations (i.e., at different physical locations) and participate in the active communication session with respective HMDs and media devices. The holographic avatars are spatially positioned relative to a particular media device, and media content is synchronized for presentation by each media device during the active communication session.

In some embodiments, process 1500 may further include spatially aligning UI elements displayed by the HMD with the media device based on information for one or more of: position, orientation, or size of the media device. Spatial alignment includes: displaying, on the media device, an image that provides information about the position or the orientation of the media device, or receiving, from the media device and via the communication channel, size information for the media device.

Figure 16:
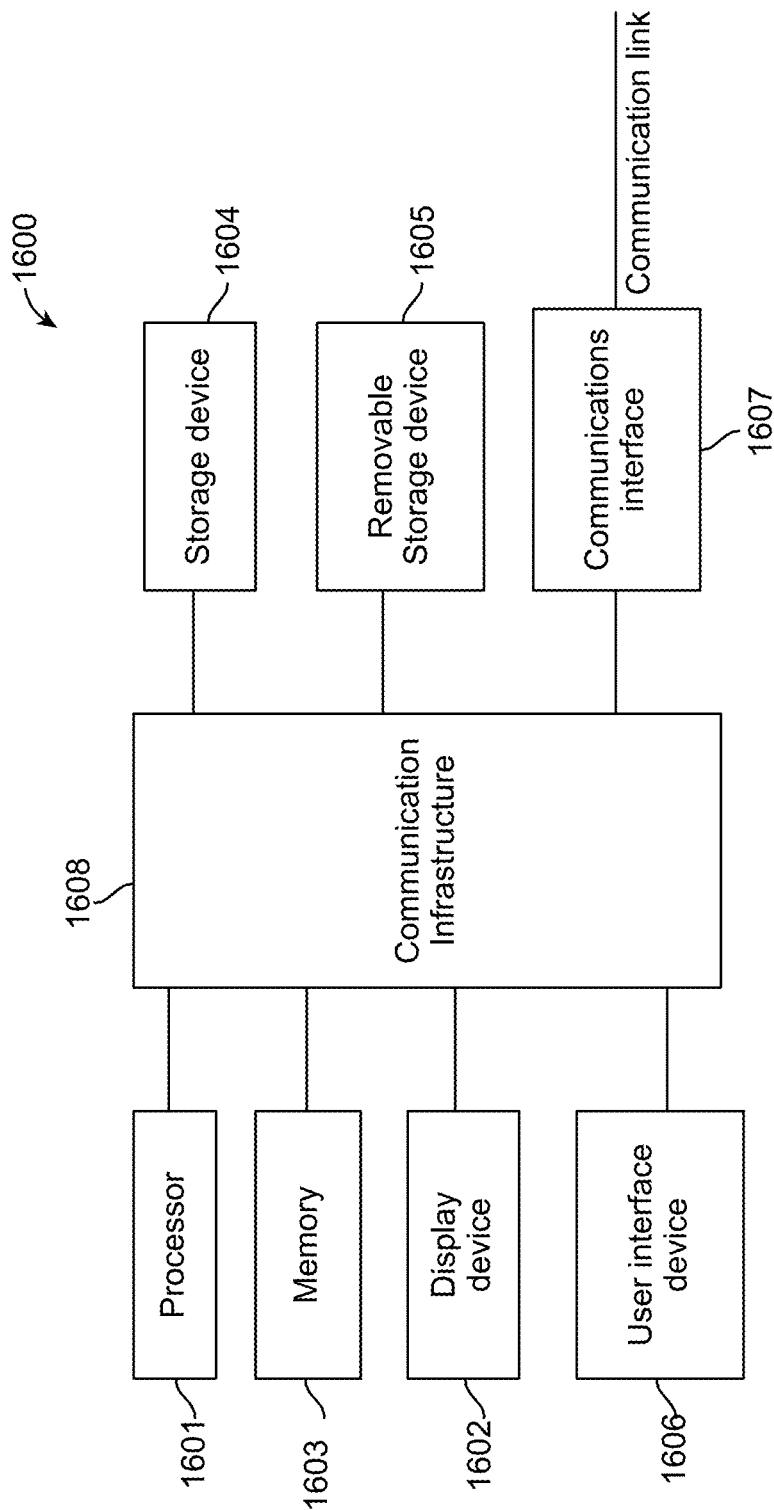
FIG. 16 is an exemplary high-level block diagram showing an information processing system comprising a computer system useful for implementing disclosed embodiments.

FIG. 16 is a high-level block diagram showing an information processing system comprising a computer system 1600 useful for implementing the disclosed embodiments. Computer system 1600 may be incorporated in a device 52, 56, FIG. 1, or devices 210 or 250, FIG. 2, media device 1210, HMD device 1220, FIG. 12, etc.). The computer system 1600 includes one or more processors 1601 (e.g., processor(s) 700, FIG. 2), and can further include an electronic display device 1602 (for displaying video, graphics, text, and other data), a main memory 1603 (e.g., random access memory (RAM)), storage device 1604 (e.g., hard disk drive), removable storage device 1605 (e.g., removable storage drive, removable memory module, a magnetic tape drive, optical disk drive, computer readable medium having stored therein computer software and/or data), user interface device 1606 (e.g., keyboard, touch screen, keypad, pointing device), and a communication interface 1607 (e.g., modem, a network interface (such as an Ethernet card), a communications port, or a PCMCIA slot and card). The communication interface 1607 allows software and data to be transferred between the computer system and external devices (e.g., over communication path 54, FIG. 1). The system 1600 further includes a communications infrastructure 1608 (e.g., a communications bus, cross-over bar, or network) to which the aforementioned devices/modules 1601 through 1607 are connected.

Information transferred via communications interface 1607 may be in the form of signals such as electronic, electromagnetic, optical, or other signals capable of being received by communications interface 1607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

In some embodiments, processing instructions for 700 (FIG. 2) may be stored as program instructions on the memory 1603, storage device 1604 and the removable storage device 1605 for execution by the processor 1601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method of coordinating a mixed-reality (MR) configured head-mounted display (HMD) with a separate media device to enable a synchronized user experience, the method comprising:
   establishing a communication channel between the HMD and the media device;
   performing, via the communication channel, at least one of:
      accessing content on the media device or executing control commands on the media device based on an interface displayed by the HMD; or
      detecting media content presented by the media device and synchronizing display of MR content on the HMD and the detected media content; and
   spatially aligning user interface (UI) elements displayed by the HMD with the media device, wherein spatial alignment comprises displaying, on the media device, information about position of the media device.

2. The method of claim 1, wherein:
   size information for the display of the media device is received from the media device via the communication channel;
   the media device is a display device or an audio device; and
   the HMD displays a holographic UI associated with the media device, the holographic UI includes selectable UI elements for at least one of: accessing applications on the media device, accessing other content on the media device, controlling settings of the media device or modifying settings on the media device.

3. The method of claim 1, further comprising:
   dynamically generating a holographic asset based on and associated with the media content presented by the media device; and
   synchronizing the media content presented by the media device with display of the holographic asset on the HMD, wherein the MR content on the HMD includes the holographic asset.

4. The method of claim 3, wherein the holographic asset is retrieved from a holographic asset store that maintains holographic assets, and the holographic assets are sold and loaded to the HMD while the HMD views content on the media device.

5. The method of claim 3, wherein a timing for loading the holographic asset while the HMD views content on the media device is specified by metadata provided by a third party associated with the holographic asset, and the media device instructs the HMD to load the holographic asset based on the timing specified by the metadata.

6. The method of claim 3, wherein the holographic asset is an interactive advertisement that is dynamically inserted via the HMD upon a triggered event by the media device, and the holographic asset is retrieved from a holographic asset store and selected based on user profiling data.

7. The method of claim 6, wherein the holographic asset triggered by the media device is used to enhance e-commerce shopping experiences by providing interaction with the holographic asset, and upon detection of the interaction with the holographic asset via the HMD, an option is presented to execute an action to facilitate a transaction associated with the holographic asset.

8. The method of claim 1, further comprising
   providing one or more holographic avatars using the HMD for other users engaged in an active communication session with a user of the HMD, wherein at least some of the users are at physical remote locations and participate in the active communication session with respective HMDs and media devices, the holographic avatars are spatially positioned relative to a particular media device, and media content is synchronized for presentation by each media device during the active communication session.

9. The method of claim 1, wherein
   the information displayed on the media device further provides information about orientation of the media device.

10. An apparatus comprising:
   a memory storing instructions; and
   at least one processor executes the instructions including a process configured to:
      establish a communication channel between a mixed-reality (MR) head-mounted display (HMD) and a media device;
      perform using the communication channel, at least one of:

accessing content on the media device or executing control commands on the media device based on an interface displayed by the HMD; or detecting media content presented by the media device and synchronizing display of MR content on the HMD and the detected media content; and spatially align user interface (UI) elements displayed by the HMD with the media, wherein spatial alignment comprises displaying, on the media device, information about position of the media device.

11. The apparatus of claim 10, wherein:

size information for the display of the media device is received from the media device via the communication channel;

the media device is a display device or an audio device; and the HMD displays a holographic UI associated with the media device, the holographic UI includes selectable UI elements for at least one of: accessing applications on the media device, accessing other content on the media device, controlling settings of the media device or modifying settings on the media device.

12. The apparatus of claim 10, wherein:

the process is further configured to:

dynamically generate a holographic asset based on and associated with the media content presented by the media device; and synchronize the media content presented by the media device with display of the holographic asset on the HMD, wherein the MR content on the HMD includes the holographic asset;

the holographic asset is retrieved from a holographic asset store that maintains holographic assets;

the holographic assets are sold and loaded to an HMD while the HMD views content on the media device;

a timing for loading the holographic asset while the HMD views content on the media device is specified by metadata provided by a third party associated with the holographic asset; and the media device instructs the HMD to load the holographic asset based on the timing specified by the metadata.

13. The apparatus of claim 12, wherein:

the holographic asset is an interactive advertisement that is dynamically inserted via the HMD upon a triggered event by the media device;

the holographic asset is selected based on user profiling data;

the holographic asset triggered by the media device is used to enhance e-commerce shopping experiences by providing interaction with the holographic asset; and upon detection of the interaction with the holographic asset via the HMD, an option is presented to execute an action to facilitate a transaction associated with the holographic asset.

14. The apparatus of claim 10, wherein:

the process is further configured to provide one or more holographic avatars using the HMD for other users engaged in an active communication session with a user of the HMD;

at least some of the users are at physical remote locations and participate in the active communication session with respective HMDs and media devices;

the holographic avatars are spatially positioned relative to a particular media device; and media content is synchronized for presentation by each media device during the active communication session.

15. The apparatus of claim 10, wherein the information displayed on the media device further provides information about orientation of the media device.

16. A non-transitory processor-readable medium that includes a program that when executed by a processor performs a method comprising:

establishing a communication channel between a mixed-reality (MR) head-mounted display (HMD) and a media device;

performing using the communication channel, at least one of:

accessing content on the media device or executing control commands on the media device based on an interface displayed by the HMD; or detecting media content presented by the media device and synchronizing display of MR content on the HMD and the detected media content; and spatially aligning user interface (UI) elements displayed by the HMD with the media device, wherein spatial alignment comprises displaying, on the media device, information about position of the media device.

17. The non-transitory processor-readable medium of claim 16, wherein:

size information for the display of the media device is received from the media device via the communication channel;

the media device is a display device or an audio device;

the HMD displays a holographic UI associated with the media device, the holographic UI includes selectable UI elements for at least one of: accessing applications on the media device, accessing other content on the media device, controlling settings of the media device or modifying settings on the media device; and the method further comprises:

dynamically generating a holographic asset based on and associated with the media content presented by the media device; and synchronizing the media content presented by the media device with display of the holographic asset on the HMD, wherein the MR content on the HMD includes the holographic asset.

18. The non-transitory processor-readable medium of claim 17, wherein:

the holographic asset is retrieved from a holographic asset store that maintains holographic assets;

the holographic assets are sold and loaded to an HMD while the HMD views content on the media device;

a timing for loading the holographic asset while the HMD views content on the media device is specified by metadata provided by a third party associated with the holographic asset;

the media device instructs the HMD to load the holographic asset based on the timing specified by the metadata;

the holographic asset is an interactive advertisement that is dynamically inserted via the HMD upon a triggered event by the media device;

the holographic asset is selected based on user profiling data;

the holographic asset triggered by the media device is used to enhance e-commerce shopping experiences by providing interaction with the holographic asset; and upon detection of the interaction with the holographic asset via the HMD, an option is presented to execute an action to facilitate a transaction associated with the holographic asset.

19. The non-transitory processor-readable medium of claim 17, wherein:
- the method further comprises providing one or more holographic avatars using the HMD for other users engaged in an active communication session with a user of the HMD;
- at least some of the users are at physical remote locations and participate in the active communication session with respective HMDs and media devices;
- the holographic avatars are spatially positioned relative to a particular media device; and
- media content is synchronized for presentation by each media device during the active communication session.

20. The non-transitory processor-readable medium of claim 16, wherein
- the information displayed on the media device further provides information about orientation of the media device.

\* \* \* \* \*